Aug. 5, 1969    H. Y. JULIUSBURGER ET AL    3,460,132
PARALLEL TO SERIAL CODE CONVERTER
Filed Sept. 7, 1965    2 Sheets-Sheet 1

INVENTORS
HANS Y. JULIUSBURGER
GEORGE R. STILWELL, JR.
BY
Edward G. Fiorito
ATTORNEY

FIG. 2

| CHARACTER REPRESENTED BY HOLES IN CARD | HOLES IN CARD | A | B | 1 | 2 | 4 | 8 | C1 | C2 |
|---|---|---|---|---|---|---|---|---|---|
| 1 | "1" | | | X | | | | X | X |
| 2 | "2" | | | | X | | | X | X |
| 3 | "3" | | | X | X | | | | X |
| 4 | "4" | | | | | X | | X | X |
| 5 | "5" | | | X | | X | | | X |
| 6 | "6" | | | | X | X | | | X |
| 7 | "7" | | | X | X | X | | X | X |
| 8 | "8" | | | | | | X | X | |
| 9 | "9" | | | X | | | X | | X |
| 0 | "0" | X | | | | | | | |
| A | "12" "1" | X | X | X | | | | X | X |
| B | "12" "2" | X | X | | X | | | X | X |
| C | "12" "3" | X | X | X | X | | | | X |
| D | "12" "4" | X | X | | | X | | X | X |
| E | "12" "5" | X | X | X | | X | | | X |
| F | "12" "6" | X | X | | X | X | | | X |
| G | "12" "7" | X | X | X | X | X | | X | X |
| H | "12" "8" | X | X | | | | X | X | |
| I | "12" "9" | X | X | X | | | X | | X |
| J | "11" "1" | | X | X | | | | X | |
| K | "11" "2" | | X | | X | | | X | |
| L | "11" "3" | | X | X | X | | | | |
| M | "11" "4" | | X | | | X | | X | |
| N | "11" "5" | | X | X | | X | | | |
| O | "11" "6" | | X | | X | X | | | |
| P | "11" "7" | | X | X | X | X | | X | |
| Q | "11" "8" | | X | | | | X | X | X |
| R | "11" "9" | | X | X | | | X | | |
| S | "0" "2" | X | | | X | | | X | |
| T | "0" "3" | X | | X | X | | | | |
| U | "0" "4" | X | | | | X | | X | |
| V | "0" "5" | X | | X | | X | | | |
| W | "0" "6" | X | | | X | X | | | |
| X | "0" "7" | X | | X | X | X | | X | |
| Y | "0" "8" | X | | | | | X | X | X |
| Z | "0" "9" | X | | X | | | X | | |
| RECORD MARK ‡ OR ‡ | "0" "2" "8" | X | | | X | | X | X | X |
| BLANK | NO PUNCHES | | | | | | | | X |
| . | "12" "3" "8" | X | X | X | X | | X | | |
| □ | "12" "4" "8" | X | X | | | X | X | X | |
| SPECIAL CHAR | "12" "5" "8" | X | X | X | | | X | X | |
| SPECIAL CHAR | "12" "6" "8" | X | X | | X | X | X | | |
| SPECIAL CHAR | "12" "7" "8" | X | X | X | X | X | X | X | |
| & | "12" | X | X | | | | | | X |
| $ | "11" "3" "8" | | X | X | X | | X | | X |
| ✴ | "11" "4" "8" | | X | | | X | X | X | X |
| SPECIAL CHAR | "11" "5" "8" | | X | X | | X | X | | X |
| SPECIAL CHAR | "11" "6" "8" | | X | | X | X | X | | X |
| △ | "11" "7" "8" | | X | X | X | X | X | X | X |
| – | "11" | | X | | | | | | |
| / | "0" "1" | X | | X | | | | X | |
| , | "0" "3" "8" | X | | X | X | | X | | X |
| % | "0" "4" "8" | X | | | | X | X | X | X |
| SPECIAL CHAR | "0" "5" "8" | X | | X | | X | X | | X |
| SPECIAL CHAR | "0" "6" "8" | X | | | X | X | X | | X |
| TAPE SEGMENT | "0" "7" "8" | X | | X | X | X | X | X | X |
| ' | "3" "8" | | | X | X | | X | | |
| @ | "4" "8" | | | | | X | X | X | |
| SPECIAL CHAR | "5" "8" | | | X | | X | X | | |
| SPECIAL CHAR | "6" "8" | | | | X | X | X | | |
| TAPE MARK | "7" "8" | | | X | X | X | X | | |

United States Patent Office 3,460,132
Patented Aug. 5, 1969

3,460,132
PARALLEL TO SERIAL CODE CONVERTER
Hans Y. Juliusburger, Putnam Valley, and George R. Stilwell, Jr., West Nyack, N.Y., assignors to International Business Machines Corporation, Armonk, N.Y., a corporation of New York
Filed Sept. 7, 1965, Ser. No. 485,339
Int. Cl. H03k 13/02
U.S. Cl. 340—347                                8 Claims

ABSTRACT OF THE DISCLOSURE

An arrangement of switches is provided for converting data on aperture cards into a series of output pulses of a given parity. The switches are arranged so that pairs of switches are responsive to apertures with parity dependent upon coincident operation of the switches.

---

Figure 1:
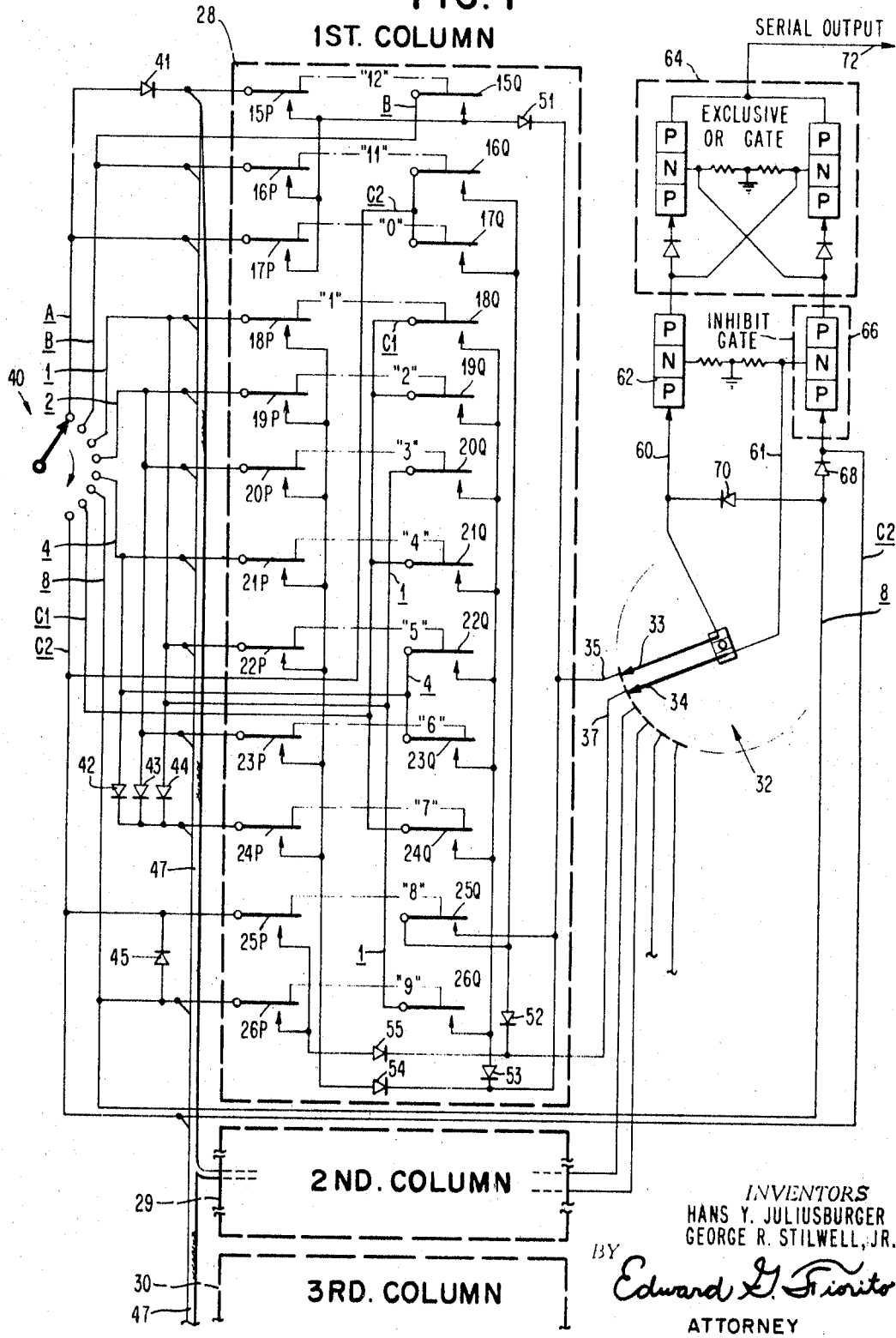

This invention relates to a decoding network and more particularly to a network which converts a number of binary digits into a series of output pulses including a parity pulse.

It is often necessary to read data processing cards at stations remote from the computer which will process the data on the cards. Therefore, it is necessary to read the data from the card accurately and to transmit the data without error from the remote station to the computer.

It has been found that addition of check bits to the data read from the card permits the transmitted data to be checked at the computer for accuracy. One common type of check bit is the parity bit. If, for example, the parity of all transmitted messages is to be odd, then a parity bit is added when the number of data bits in the message is even. In a similar manner when the number of data bits in the message is even. In a similar manner when the number of data bits in the message is odd, no parity bit is added to the message. Each message may be checked at the computer to determine whether the number of bits in the message, or the parity of the message, is odd.

It is an object of the present invention to provide an improved network for adding parity bits to binary data.

Another object of the present invention is to provide a decoder network capable of adding parity bits to the decoded message with a minimum of hardware.

Still another object of the present invention is to provide an improved decoder and parity generator not requiring a power supply.

It is another object of the present invention to provide an improved decoder and parity generator capable of transmission over a single wire-pair.

These and other objects of the present invention are accomplished by providing a plurality of pairs of switches, each pair operating in response to a different one of the holes in a data processing card. A series of input terminals receiving input pulses in a sequential fashion are selectively connected to the switches so that each switch is connected to a group of one, three, five or any odd number of terminals. In this manner, if only one member of a pair of switches is operated in response to a hole in a data processing card due to a faulty operation of the other member, then the parity of the transmitted message will be changed and an error detected at the computer.

In accordance with another aspect of the present invention, parity bits are selectively added to the transmitted message by applying a parity pulse to one input of an inhibit gate and the output of a few selected switches are applied to a second input of the inhibit gate. The output of the inhibit gate is applied to one input of an exclusive OR gate, and the other input of the exclusive OR gate receives the output from the remaining switches. In this manner, the parity bit can be generated using a minimum of hardware, and the message can be transmitted over a single pair of wires.

Another advantage of the present invention is the lack of a requirement for a power supply at the remote station. The only energy supplied to the station is in the form of the time divided input pulses.

The foregoing and other objects, features and advantages of the invention will be apparent from the following more particular description of a preferred embodiment of the invention, as illustrated in the accompanying drawings.

In the drawings:

FIG. 1 is an electrical schematic of a network embodying the present invention; and FIG. 2 is a chart showing the relationship between the character represented by the holes in the data processing card and the corresponding message generated by the decoding network shown in FIG. 1.

The decoding network of FIG. 1 reads a standard data processing card having 80 columns, each column having twelve positions for punching holes. The columns are read one by one so that the decoder of FIG. 1 examines twelve card hole positions at the same time and converts the combination of holes into a serial pulse output message including a parity bit. It is to be understood that reference herein, in the specification and claims, to a series of output pulses is taken to mean either a single pulse or a plurality of pulses. As can be seen by reference to FIG. 2 the series of outputs representing a given message may comprise from one to seven pulses.

Most conventional data processing codes allow punching of one, two, or up to three holes in the same twelve positioned column. In the preferred embodiment as shown in FIG. 1, twelve pairs of switches 15P through 26P, and 15Q through 26Q are operated in response to a column of twelve punched hole position on a data processing card (not shown). For example, the "12" hole position of the card operates switches 15P and Q when a hole is punched in this position of the card. The "12," "11," and "0" hole positions of the card are referred to as the zone holes, while the "1" through "9" positions are referred to as the numeric holes. The punched hole positions on the card which operate switches 15–26 are indicated in FIG. 1 by the broken line connection to the numbers "0" through "12."

A broken line rectangle 28 is drawn around the switches 15–26 to indicate that they respond to the first column on the card. Other sets of switches similar to switches 15–26 are included within a rectangle 29 and another rectangle 30 which respond to the second and third columns respectively of the card. In order to read one column at a time, a commutator 32 is provided with double wiper arms 33 and 34. The wiper arms are shown connected to a pair of output lines 35 and 37 from the set of switches in rectangle 28. Other pairs of lines from rectangles 29, 30, etc. are connected to commutator 32 so that the second, third, etc. columns of the card may be read by advancing the wipers 33 and 34 to the next position of commutator 32.

The only energy supplied to the decoder of FIG. 1 is in the form of a series of input pulses supplied by a distributor 40. The distributor 40 supplies pulses sequentially in a time divided fashion to a number of lines A, B, 1, 2, 4, 8, C1, and C2. The distributor 40 begins a cycle by delivering a pulse to line A and ends the cycle by delivering a pulse to line C2.

The lines A through C2 are connected to switches 15–26 either directly, or by a group of diodes 41–45. The diodes perform the function of isolating lines A through C2 from one another. A cable 47 couples the input pulses to the other column switches in recangles 29, 30, etc. The output of the switches 15–26 are joined to either lines 35, or 37 through a group of isolation diodes 51–55.

In operation, the input pulses distributed to lines A through C2 are coupled to lines 35 or 37 under control of the switches 15–26. For example, the input line A is connected to switches 15P and 17P. If either switch 15P or switch 17P is closed, a pulse is coupled at the beginning of the cycle through diode 51 to line 35. The next pulse generated during this cycle appears on line B which is connected to switches 16P and 15Q. If either of these switches are closed, the input pulses are coupled through diode 51 to line 35.

Brushes 33 and 34 are connected to lines 60 and 61. A transistor 62 couples the signals on line 60 to one input of an exclusive OR gate 64. The other input of exclusive OR gate 64 is received from an inhibit gate 66. Inhibit gate 66 has two inputs, one from line 61 and the other from lines C2 and 8, the latter being coupled through a diode 68. The line 8 is also coupled through another diode 70 to line 60. Both diodes 68 and 70 perform the same isolation function as the previously mentioned diodes.

In operation, inhibit gate 66 couples the pulses on lines C2 and 8 to the input of exclusive OR gate 64 only when no pulses are coincidentally present on line 61. The exclusive OR gate 64 provides an output on line 72 when a pulse appears on either one of the inputs thereof, but not when pulses appear coincidentally on both inputs thereof.

Pulses appear on line 72 in a serial fashion corresponding to the manner in which distributor 40 applies pulses to input lines A through C2. The input pulses on lines A through C2 are either blocked, or permitted to pass to the serial output line 72 under control of switches 15–26, and in accordance with the logic of exclusive OR gate 64 and inhibit gate 66. A chart is provided in FIG. 2 to show the realtionship between holes punched in the card not shown and a series of pulses appearing at output 72. In the left column of the chart, a column of numbers, letters, and symbols are listed. These are the characters conventionally employed in data processing machines and will be used herein to illustrate the operation of the decoder of FIG. 1. The middle column lists the holes which are punched in the data processing card corresponding to each character in the column on the left. The numbers 1 through 9 each have one hole punched in the numeric hole positions of the card. The 0 character has a hole punched in the "0" zone position of the card. All of the letters of the alphabet *a* through *z* have two holes punched in the data processing card, one in the zone position, and one in the numeric position. The remaining symbols have either one, two or three holes punched in the data processing card.

In operation, assuming the number 1 is stored in the column of the card to read, a hole is punched in the "1" position of the card. This causes switches 18P and 18Q to be closed. When the distributor 40 reaches the third position of the card. This causes switches 18P and 18Q coupled to switches 18P, 22P, 20Q, 26Q, and 24P. Since only switches 18P and 18Q are closed, the input pulse on line 1 is coupled through switch 18P and diode 54 to line 35. The input pulse on line 1 passes through brush 33, line 60, and transistor 62 to one input of exclusive OR gate 64. At this time, no other pulse is present in the decoder of FIG. 1 so that exclusive OR gate 64 receives only one input from transistor 62 which is coupled to the serial output line 72. This pulse is represented in the group of columns on the right of the chart in FIG. 2 by the X under the column headed with a designation 1 and in the row containing the number 1.

When the distributor 40 reaches the input line C1, a pulse is coupled through switch 18Q, diode 53, line 35, brush 33, line 60, and transistor 62 to one input of exclusive OR gate 64. Since no other input is applied at the same time to exclusive OR gate 64 the pulse on input line C1 appears at serial output line 72. This pulse is designated in FIG. 2 under column C1 in the row containing the number 1.

When distributor 40 reaches the line C2, an input pulse is applied directly to the input of inhibit gate 66. All the switches connected to input line C2 are open so that no pulse appears on line 61 at the other input to inhibit gate 66. Therefore, the input pulse on line C2 is coupled through inhibit gate 66 to one input of exclusive OR gate 64. Since no other input is applied to exclusive OR gate 64 at this time, the input pulse on line C2 is coupled to the serial output 72. This pulse is represented by the X under the column headed C2 in the row containing the number 1. This completes the cycle for reading the column of the card containing the number 1. The message as shown in the chart of FIG. 2 includes a serial train of three pulses appearing when the distributor provides pulses to lines 1, C1, and C2. The last two pulses, C1 and C2, are referred to as the parity bits, while the first pulse, 1 is referred to as the message bit. The parity of the entire message is odd. That is, the transmitted message contains either one, three, five or seven pulses. Such a message is considered to be a valid message by the computer (not shown) observing output line 72.

Inspection of the chart in FIG. 2 indicates that each series of pulses has an odd parity. Therefore, if an odd number of pulses are dropped from the proper sequence, the parity of the message changes from odd to even. In order to produce this change from an odd parity to an even parity in the output message, all of the switches 15–26, with the exception of switch 25P, are connected to an odd number of input lines A through C2. Therefore, if one member of a pair of switches closes while the other member does not close due to some defect, the parity of the output message changes from odd to even and the defect is detected.

The selective grouping of the output of switches 15–26 into two lines 35 and 37, and the use of the inhibit gate 66 and the exclusive OR gate 64 permit the generation of the proper parity bit with a minimum of hardware. The following list illustrates the general rules guiding the logical operation of the decoder:

I.—If no holes are punched in the card, the pulse on line 8 is coupled by diode 70 and transistor 62 to one input of exclusive OR gate 64, and by diode 68 and inhibit gate 66 to the other input of exclusive OR gate 64. The two inputs to exclusive OR gate 64 cancel one another and the pulse on line 8 does not reach the output 72. The parity pulse on line C2 is coupled through inhibit gate 66 to one input of exclusive OR gate 64 and arrives at the output to cause the output message to have an odd parity.

II.—If only a single hole is punched in the column, and;

(a) The single hole is punched in the numeric position of the card, and;

(1) The single hole is punched in either one of the "1," "2," "4" or "7" positions, then either one of three pulses are coupled to the output line 72 by a member of switches 15P through 26P. Parity pulse C1 is coupled to line 35 by a member of the switches 15Q–26Q, and the second parity pulse C2 is coupled through inhibit gate 66 and exclusive OR gate 64 to the output to provide an odd parity.

(2) The single hole is punched in the "3," "5," or "6" positions of the card, then two of the input pulses 1, 2 or 4 are transmitted through the switches 15–26 to output 72. The parity pulse C2 is coupled through inhibit gate 66 to output 72.

(3) The single hole is punched in the "8" position of the card, then the input pulses 8 and C2 are coupled by members of the switches 15–26 to line 61. The pulses on line 61 inhibit the pulses on lines 8 and C2 coupled to the other input of inhibit gate 66. However, the pulse on line 8 coupled by diode 70 and transistor 62 to the input of exclusive OR gate 64 passes to output 72.

(4) A single hole is punched in the "9" position of a card, then the pulse on line 8 transmitted through switch 26P to line 37 cancels the pulse on line 8 coupled by diode 68 to inhibit gate 66. The pulse on line 8 coupled by diode 70 and transistor 62 passes through exclusive OR gate 64 to the output. The pulse on line 1 passing through switch 26Q to line 35 is transmitted to output 72. The parity bit on line C2 is coupled through inhibit gate 66 and exclusive OR gate 64 to the output 72 to provide an odd parity.

(b) A single character is punched in one of the zone holes "0," "11," or "12," and;

(1) A single hole is punched in the "0" or the "11" zone of the card, then a pulse on either one of the lines A or B is transmitted through a member of the switches 15P–26P to output 72. The parity bit on line C2 is transmitted by a member of the switches 15Q through 26Q to line 37 inhibiting the pulse on line C2 applied to inhibit gate 66.

(2) The single hole is punched in the "12" zone, then the pulses on input lines A and B are coupled by switches 15P and Q to output 72. The parity bit C2 applied to inhibit gate 66 is coupled to the output 72 providing an odd parity.

III.—If two holes are punched in a column of the data processing card, and:

(a) A hole is punched in one of the numeric card positions "1" through "9" and a hole is punched in the "12" zone, then since the "12" hole adds two pulses (from lines A and B) to the output message, no change in the parity is required from that described for the numeric characters above in paragraphs II(a)(1) through (4). Therefore, the pulses from lines A and B are simply added to the pulses generated in response to the numeric position holes on the card.

(b) A hole is punched in one of the numeric positions "1," "2," "4" or "7," and a hole is punched in either the "0" or "11" zone of the card, then the addition of either the A or B pulse to the output message requires the cancellation of parity bit C2 by closure of either switch 16Q or 17Q and application of the C2 pulse to inhibit gate 66 via line 61 and 37.

(c) A hole is punched in one of the numeric positions "3," "5," or "6" and a hole is punched in either the "0" or "11" zone, then the parity bit C2 is inhibited in the same manner as described in paragraph III(b).

(d) A hole is punched in the "8" position and in either the "0" or "11" zone, then the C2 pulse is transmitted through either switch 16Q to 17Q and through switch 25Q to line 35 where it is coupled to the output 72 resulting in odd parity.

(e) A hole is punched in the "9" position, and a hole is punched in either the "0" or "11" zone, then the parity pulse C2 is cancelled as in III(c).

(f) A hole is punched in one of the numeric positions "1," "2," "4" or "7" and the "8" position is punched, then the parity bit C2 transmitted through switch 25P cancels the parity bit C2 applied directly to inhibit gate 66.

(g) A hole is punched in one of the numeric positions "3," "5," or "6," and the "8" position is punched, then the parity bit C2 applied directly to inhibit gate 66 is cancelled by the parity pulse C2 transmitted through switch 25P.

IV.—Three holes are punched in the same column of the data processing card, and:

(a) One hole is punched in one of the numeric positions "1' through "7," or "9," the "8" position is punched and the "12" zone is punched, then since the "12" zone punch adds an even number of pulses (both A and B) to the combination described in III(a) no change in the parity bits is required, and the two pulses A and B are simply added to the combinations included in III(a).

(b) A hole is punched in one of the numeric positions "1," "2," "4" or "7," and the "8" position is punched, and one of the zone positions "0" or "11," then the 8 pulse added to the numeric positions cancels one of the parity bits as in III(f). The further addition of one of the zone positions "0" or "11" restores the correct parity by adding a parity pulse as in III(d).

(c) A hole is punched in one of the numeric positions "3," "5" or "6," a hole is punched in the "8" position, and a hole is punched in either the "0" or "11" zone, then the 8 pulse added to the numeric position holes cancels the parity bit generated by numeric positions as in III(g). The further addition of one of the zone position holes "0" or "11" restores the correct parity by adding a parity bit as in III(d).

Although the decoder of FIG. 1 generates parity bits so that the output message has an odd parity, other applications may call for an even parity message to be transmitted. In either case the number of input lines A through C2 connected to each switch should have an odd parity so that a single switch failure causes the parity of the output message to change. Also, it may be necessary to sacrifice this error detecting feature (as in the case of switch 25P which has two input lines C2 and 8 connected thereto) where a saving in hardware can be achieved.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A decoding network for converting a plurality of coded digital indications into a series of output pulses, each of said plurality of coded digital indications producing a different series of output pulses with each of said series of output pulses having the same parity, comprising:

input means including a plurality of input terminals sequentially receiving input pulses;

switching means including a plurality of pairs of switches with each switch having switch input means and switch output means with each pair of switches coincidently operative to couple respective switch input means to respective switch output means in response to a different one of said digital indications;

output circuit means for providing said series of output pulses; and circuit means coupling said output circuit means to said input means including means coupling said output circuit means to each of said switch output means and means coupling said input terminals to selected ones of said switch input means so that each switch input is coupled to an odd number of said input terminals and said series of output pulses on said output circuit means has said same parity when each of said pairs of switches operates in coincidence.

2. The decoding network as set forth in claim 1 wherein said parity is odd.

3. The decoding network as set forth in claim 1 wherein the terminals of a distributor means are said input terminals sequentially receiving input pulses.

4. A decoding network for converting a plurality of encoded digital indications into a series of output pulses, each of said plurality of encoded digital indications producing a different series of output pulses with each of said series of output pulses provided the same parity, comprising:

input means including a plurality of input terminals sequentially receiving input pulses with at least one of said terminals receiving a parity pulse;

switching means including a first and second group of switches, each of said switches having a switch input means and a switch output means and operated in response to selected ones of said digital indications to couple said switch input means to said switch output means;

coupling means for connecting said input terminals to the said switch input means of selected ones of said switches; and output means including combining means coupled to said switch output means of each of said switches of said first group of switches to provide said series of output pulses, said output means including adding means coupled to said terminal receiving said parity pulse for selectively adding said parity pulse to said series of output pulses when said series of output pulses is not said same parity, said adding means including inhibit means coupled to said second group of switches for selectively inhibiting addition of said parity pulse when said series of output pulses is said same parity.

5. A decoding network for converting a number of binary digits into a series of output pulses, each arrangement of binary digits producing a different series of output pulses having a certain parity, comprising:

input means including a plurality of input terimnals sequentially receiving input pulses, at least one of said terminals receiving a parity pulse;

switching means including a first and second group of switches operated in response to selected ones of said binary digits;

coupling means for connecting said input terminals to selected ones of said switches;

an inhibit gate having a first and second input, and an output to which signals are coupled from said first input only when no signals are coincidently present on said second input;

an exclusive OR gate having a first and a second input and an output.

combining means for coupling said first group of switches to the first input of said exclusive OR gate coupling said second group of switches to the second input of said inhibit gate, joining said terminal receiving said parity pulse to the first input of said inhibit gate, and connecting the output of said inhibit gate to said (first) second input of said exclusive OR gate, whereby the output of said exclusive OR gate provides said series of output pulses.

6. A decoding network for converting a plurality of coded digital indications into a series of output pulses, each of said plurality of coded digital indications producing a different series of output pulses having a certain parity, comprising:

input means including a plurality of input terminals sequentially receiving input pulses with at least one of said terminals receiving a parity pulse;

switch means including a plurality of pairs of switches with each switch having switch input means and switch output means, each pair of switches operated coincidently in response to a different one of said digital indications to couple said switch input means to said switch output means;

coupling means for connecting said input terminals to the said switch input means of selected ones of said switches, each switch being connected to a group of at least one or more of said terminals, where the total number in each said group has an odd parity; and combining means for combining the said switch output means of said switches to form a first series of output pulses, and for selectively adding said parity pulse to said first series to provide said series having said certain parity, said combining means including gating means connected to said terminal receiving said parity pulse and to the said switch output means of selected ones of said switches for inhibiting said parity pulse in response to the operation of said selected switches when said first series is of said certain parity.

7. A decoding network for converting a number of binary digits into a series of output pulses, each arrangement of binary digits producing a different series of output pulses having a certain parity, comprising:

a plurality of input terminals receiving input pulses in a sequential fashion, at least one of said terminals receiving a parity pulse;

coupling means for connecting each of said input terminals to selected ones of said switches, each switch being connected to a group of at least one or more of said terminals, where the total number in each said group has an odd parity;

an inhibit gate having a first and a second input, and an output to which pulses are coupled from said first terminal only when no pulses are coincidently presend on said second input;

an exclusive OR gate having a first and a second input and an output;

combining means for coupling a number of said switches to the second input of said exclusive OR gate and the remaining ones of said switches to the second input of said inhibit gate, and for connecting said terimnal receiving said parity pulse to the first input of said inhibit gate and the output of said inhibit gate to the first input of said exclusive OR gate, whereby said series of output pulses are provided at the output of said exclusive OR gate.

8. A decoding network for converting a column of holes in a data processing card into a series of output pulses, each combination of holes producing a different series of output pulses having a certain parity, comprising:

distributor means sequentially generating pulses at a plurality of output terminals thereof, one of said terminals providing a parity pulse;

a plurality of pairs of switches each pair having an input and an output, and each pair operated in response to a different one of said holes;

coupling means for connecting each of said terminals to the input of selected ones of said switches, each switch being connected to a group of at least one or more of said terminals where the total number in each said group has an odd parity;

an inhibit gate having a first and a second input and an output to which pulses are coupled from said first input only when no pulses are coincidently present on said second input;

an exclusive OR gate having a first and a second input, and an output to which pulses are coupled only if a pulse appears on the first or second input, but not if pulses appear on both inputs thereof; and combining means for coupling the output of certain ones of said switches to the second input of said exclusive OR gate and for coupling the outputs from the remaining ones of said switches to the second input of said inhibit gate, and for connecting said terminal generating said parity pulse to the first input of said inhibit gate, and the output of said inhibit gate to the first input of said exclusive OR gate, whereby the output of said exclusive OR gate provides said series of output pulses.

References Cited

UNITED STATES PATENTS

| | | | |
|---|---|---|---|
| 2,907,768 | 10/1959 | Kautz | 340—146.1 X |
| 2,907,769 | 10/1959 | Spaulding | 340—347 |
| 3,138,782 | 6/1964 | Estrems et al. | 340—146.1 X |

MALCOLM A. MORRISON, Primary Examiner

R. STEPHEN DILDINE, Jr., Assistant Examiner

U.S. Cl. X.R.

235—61; 307—216, 217; 340—146